United States Patent [19]

Kropp et al.

[11] 4,198,373

[45] Apr. 15, 1980

[54] LOW PROFILE DRIVE FOR AGITATOR SHAFT OF CHEMICAL REACTOR VESSEL

[75] Inventors: Donald E. Kropp, Ft. Thomas, Ky.; Glenn E. Caldwell, Cincinnati, Ohio

[73] Assignee: The Ceramic Coating Company, Newport, Ky.

[21] Appl. No.: 957,480

[22] Filed: Nov. 3, 1978

[51] Int. Cl.² .................. B01F 7/16; B01F 15/00; B01J 1/00; B01J 10/00
[52] U.S. Cl. ................... 422/49; 277/93 R; 422/225; 422/135; 366/282; 366/283
[58] Field of Search ................ 366/281–283; 422/49, 225; 74/421 A; 277/41, 93 R

[56] References Cited

U.S. PATENT DOCUMENTS

| | | | |
|---|---|---|---|
| 2,774,654 | 12/1956 | Reed | 422/225 X |
| 2,931,631 | 4/1960 | Harrison | 165/66 |
| 3,112,994 | 12/1963 | Donaldson | 422/225 X |
| 3,239,168 | 3/1966 | Wiemann et al. | 248/646 |
| 3,287,092 | 11/1966 | Sludder | 422/225 |
| 3,634,042 | 1/1972 | McCoun | 422/49 |
| 3,839,435 | 10/1974 | Shigeyasu et al. | 422/225 X |
| 3,877,706 | 4/1975 | Haas et al. | 277/41 |

*Primary Examiner*—Michael S. Marcus
*Attorney, Agent, or Firm*—Kinney & Schenk

[57] ABSTRACT

A low profile drive assembly for the agitator shaft of a reactor vessel is mounted for lateral movement relative to the agitator shaft whereby to provide access to and removal of the shaft-seal assembly via the space vacated by the drive.

17 Claims, 8 Drawing Figures

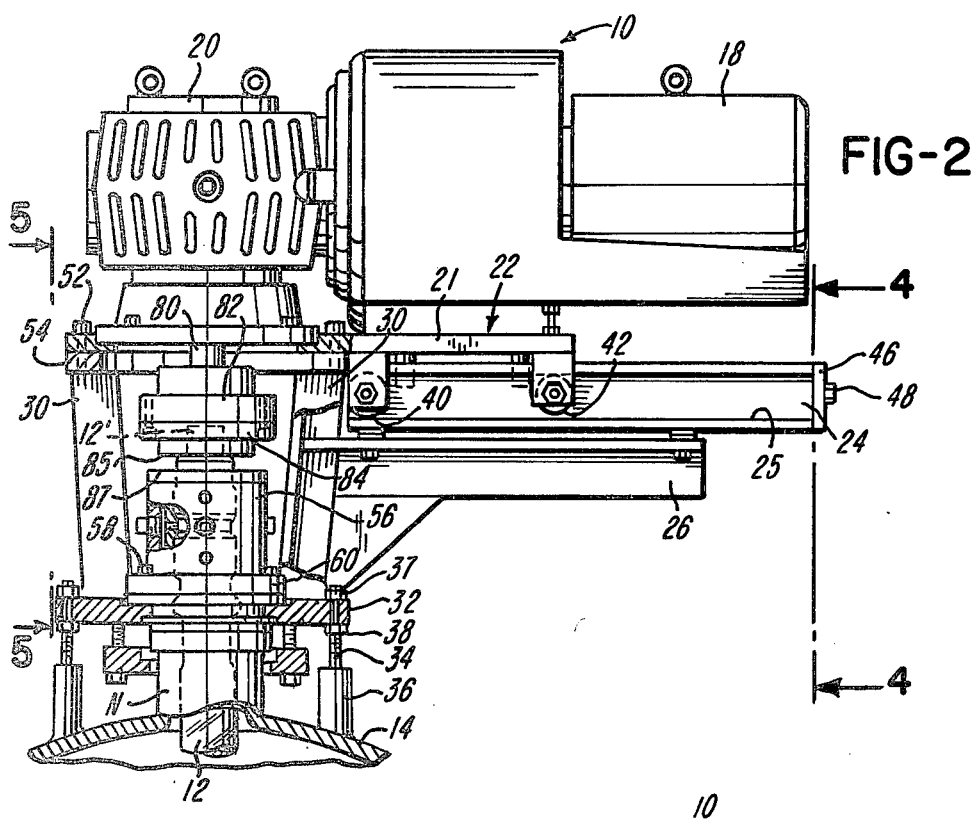

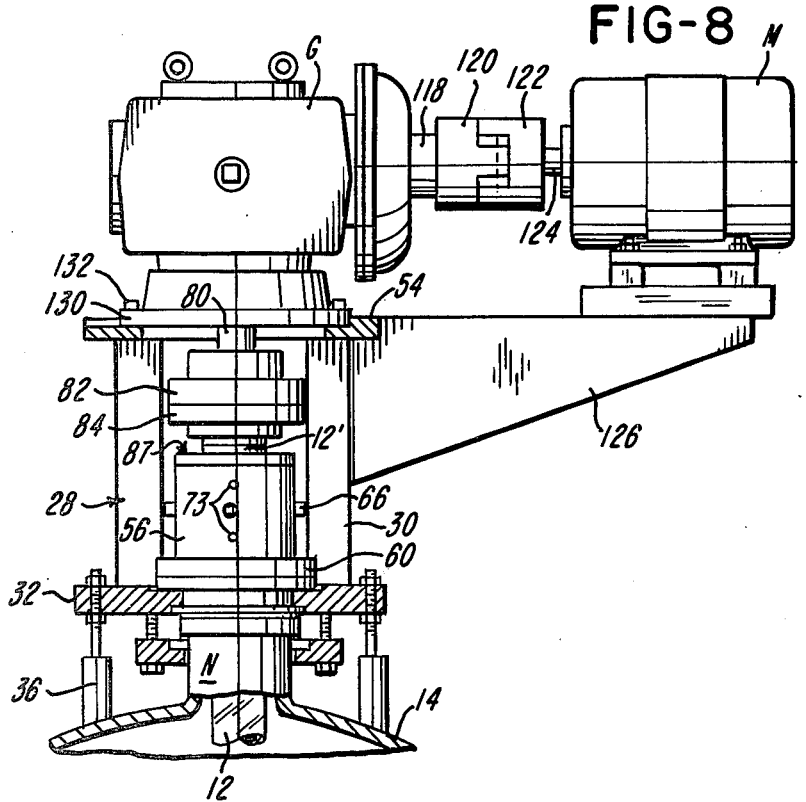

LOW PROFILE DRIVE FOR AGITATOR SHAFT OF CHEMICAL REACTOR VESSEL

BACKGROUND OF THE INVENTION

1. Field of the Invention

The subject invention is directed to a low profile drive mechanism for the agitator shaft of a chemical reactor vessel which includes a removable shaft-seal cartridge.

2. Description of the Prior Art

U.S. Pat. No. 3,877,706 of L. L. Haas discloses, in FIG. 1 thereof, drive means for the agitator shaft of a reactor vessel which drive means must be substantially disassembled in order to obtain access to the shaft seal. A motor drive is mounted on the top and to one side of an elongate drive housing which extends upwardly from a mounting flange which defines an opening in the top of the vessel through which the upper end-adjacent portion of the agitator shaft projects. A housing for a removable shaft-seal-cartridge is secured relative to said mounting flange interiorly of the lower end of the drive housing wherein the overall height of the drive housing is six and one-half times the overall height of the seal housing.

A quill sleeve is rotatably mounted within the drive housing by means of a first thrust bearing adjacent the upper end of the sleeve and a second thrust bearing adjacent the lower end thereof.

An elongate quill shaft is disposed within the quill sleeve wherein the upper end of the quill shaft is bolted to the upper end of the quill sleeve and wherein the lower end of the quill shaft is provided with a tapered socket into which the complementary tapered end of the agitator shaft is received and disposed in driven relationship with the socket via a key.

The lower end of an elongate drawbar which is housed within the quill shaft is threaded into the upper end of the agitator shaft whereas the upper end thereof is threaded into an opening in a lock nut ring which rests upon the upper end of the quill shaft. Jack screws lift the lock nut relative to the quill shaft for drawing the tapered end of the agitator shaft into the tapered socket of the quill shaft.

In order to further insure the connection between the quill sleeve and the agitator shaft end a wedged collar and a wedged split adaptor ring are inserted into the annular space between the agitator shaft and quill sleeve below the lower end of the quill shaft, and screw means are provided for imparting relative movement to said collar and ring for securely anchoring the lower end of the quill sleeve relative to the lower bearings whereby the upper end of the agitator shaft is rotatably supported against radial thrust loads.

The aforesaid drive means cannot be disconnected or uncoupled from the agitator shaft until and unless the seal cartridge within the seal housing has been lifted out of its housing and slid upwardly along that portion of the agitator shaft between the lower end of the quill sleeve and the upper end of the seal housing, and until after a split plate is clamped about the agitator shaft at a location below the lower end of the having-been-raised seal cartridge.

The wedged split adaptor ring is then removed from the annular space below the quill shaft, and the wedged collar is lowered onto the upper end of the raised seal cartridge. The jack screws in the lock nut are actuated to lower the drawbar to loosen the connection between the tapered end of the actuator shaft and the drive socket of the quill shaft by forcing the agitator shaft downwardly a short distance until the split plate thereon engages the upper end of the seal housing. The lock nut is unscrewed from the upper end of the drawbar after which the upper end of the quill shaft is unbolted from the upper end of and then withdrawn upwardly through the outer quill sleeve thereby providing access to the interior of the quill sleeve.

Long bolts are then introduced into the quill sleeve and their lower ends are threaded into tapped holes in the collar resting on the upper end of the raised seal cartridge after which the bolts are raised to withdraw the collar upwardly through and out the upper end of the quill sleeve.

The long bolts are then reintroduced into the quill sleeve whereby to threadably engage the upper end of the seal cartridge which is then pulled upwardly through and out the upper end of said sleeve.

The upper end of the agitator shaft at all times projects upwardly into and in radially spaced relationship with the lower portion of the quill sleeve by an appreciable distance which is at least equal to the overall height of the housing of the seal cartridge whereby removal of the seal cartridge from the agitator shaft can only be accomplished by initially moving the cartridge upwardly along the agitator shaft and thence upwardly along and through the inside of the quill sleeve and over the drawbar which projects upwardly from the upper end of the agitator shaft within the quill sleeve.

From the foregoing it will be noted that considerable headroom space is required above the upper end of the elongate drive housing to provide access to and accommodate the length of the quill shaft and the long bolts which are inserted into the upper end of the quill sleeve as aforesaid.

U.S. Pat. No. 2,931,631 of E. S. Harrison discloses drive means for the upper portion of the agitator shaft of a reactor vessel wherein the shaft is provided with a mechanical seal located within an outer shell or housing having an upper flanged end which is bolted to a drive bearing on a drive shaft the lower end of which is disposed in radially spaced relationship with the interior of an axial line in the upper end of the agitator shaft, and a lower flanged end which is bolted to the flanged nozzle of a reactor vessel. Considerable head room above the drive bearing is required in order to effect sufficient disassembly of the drive mechanism to provide access to the sealing means which are secured, in circumscribing relationship with the outer surface of the end-adjacent portion of the agitator shaft. As clearly illustrated in FIG. 1 sufficient headroom is required to permit the withdrawal of the upper depending drive shaft by an amount sufficient to remove it from the axial bore in the drive bearing which is bolted to the upper flange of the seal housing and from the axial bore in the upper end of the agitator shaft. Thereafter the lower flange of the seal housing is disconnected from the flange nozzle of the vessel for enabling it and the drive bearing to be lifted upwardly off the sealing means on the upwardly projecting portion of the agitator shaft.

Alternatively, the lower flange of the seal housing can be disconnected from the flanged nozzle thereby permitting the seal housing, the drive bearing, and the upper drive shaft and its drive means to be lifted upwardly by an amount to provide access to the seal mechanism.

Another type of drive mechanism for the upper end of an agitator shaft which is provided with a seal cartridge utilizes a spacer spool of considerable length which is interposed between the lower surface of a drive coupling which is secured to and depends from the lower end of the depending drive shaft of a drive mechanism which is secured to and carried by an elongate motor housing the lower end of which is mounted relative to the nozzle flange of a reactor vessel.

Removal of the elongate spacer spool provides access to the seal without necessitating lifting of the drive mechanism, however the considerable spacing between the drive shaft and agitator shaft requires the use of a steady bearing in the seal cartridge which introduces additional alignment procedures in assembly.

To the best of applicants' knowledge the prior art drive mechanisms hereinabove referred to require headroom space above the mounting flange of the nozzle of a reactor vessel of from a minimum of four and one-half feet to something in excess of seven feet, in order to provide access to and permit the removal of the seal which circumscribes the upper end-adjacent portion of the agitator shaft of the vessel.

SUMMARY OF THE INVENTION

The upper end of the rotatable agitator shaft of a typical chemical reactor vessel is releasably disposed in driven relationship with and supported from the relatively short depending output drive shaft of the gear reducer portion of a drive mechanism when the gear reducer is releasably anchored to the upper end of a support pedestal with the output shaft in axial alignment with the agitator shaft. The adjacent ends of the axially aligned shafts are provided with interconnectable coupling collars which in the process of being disconnected provide a quarter of an inch space between their adjacent surfaces.

In the preferred embodiments of the invention the gear reducer and the drive motor therefore are secured to and carried by a carriage which is mounted for lateral movement between advanced and retracted positions relative to the upper end of the pedestal whereby the gear reducer and motor are conveniently movable relative to the agitator shaft for providing free access to the upper end thereof in the space occupied by the gear reducer when the carriage is in a fully advanced position.

In a modification of the invention only the gear reducer is adapted to be laterally displaced relative to the upper end of the agitator shaft, the reducer being releasably coupled to a drive motor which is secured to and carried by a non-movable support.

The structural details of the subject device are such as to provide a drive mechanism characterized by its low overall profile and which is laterally movable for providing access to the upper end of the agitator shaft whereby to provide easy access to the cartridge seal of the agitator which can be removed for inspection, replacement, or the like, within the headroom space vacated by the laterally displaced drive means.

The subject drive means require from two to five feet less headroom than that required by the prior art and/or competitive drives, and by reason of the close or short coupling provided between the agitator and drive shafts the need for a steady bearing in the seal means, or around any portion of the agitator shaft has been effectively eliminated without impairing, but actually enhancing the relationship between the agitator and drive shafts.

DESCRIPTION OF THE DRAWINGS

FIG. 2 is a fragmentary side view with parts broken away.

FIG. 3 is a view similar to FIG. 2 with parts showing in a moved position.

FIG. 4 is a fragmentary plan view taken on line 4—4 of FIG. 2.

FIG. 8 is a side elevational view of a modification of the drive of the invention.

DESCRIPTION OF THE PREFERRED EMBODIMENT

Figure 1:
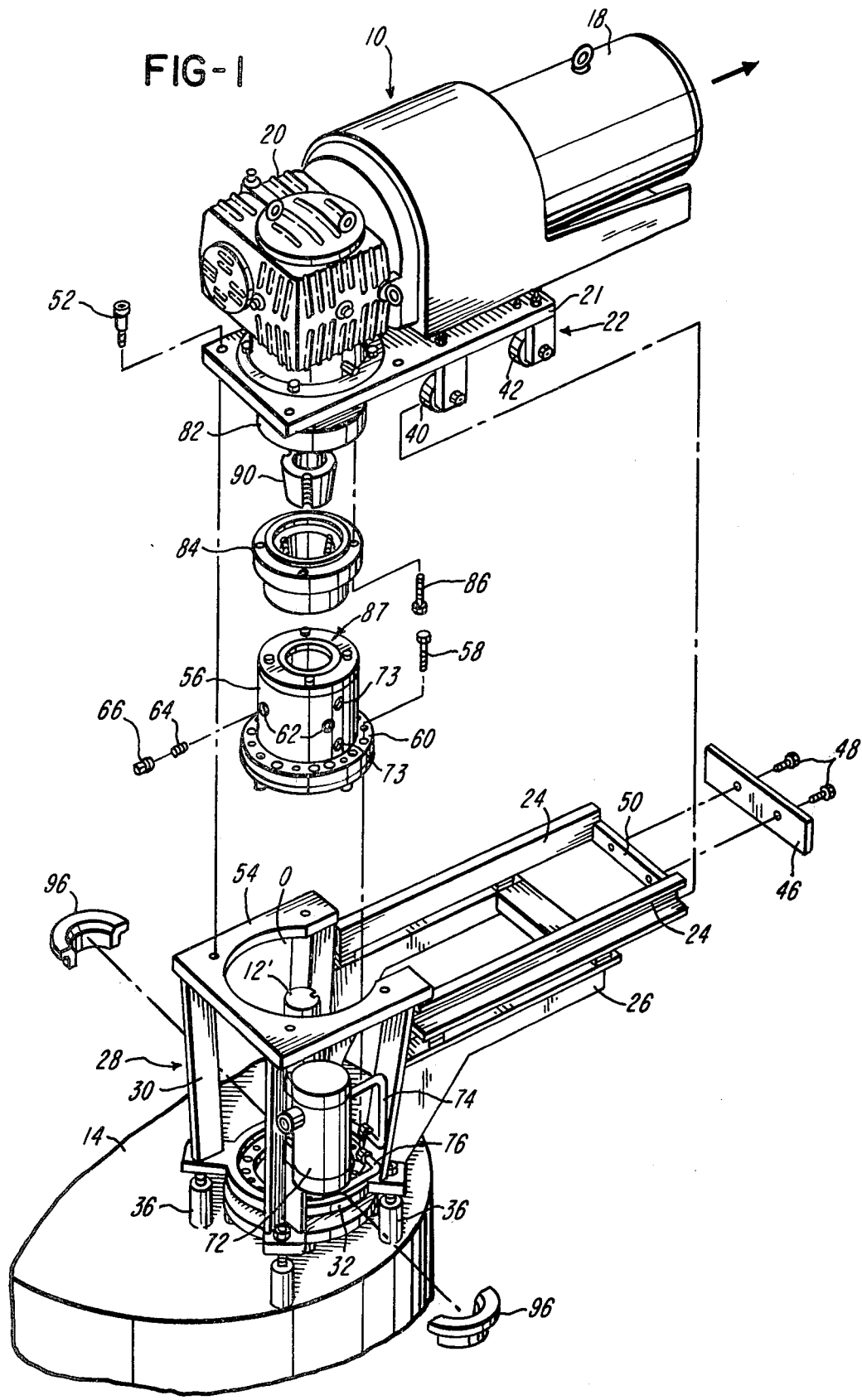
FIG. 1 is an exploded perspective view of the elements comprising the low profile drive mechanism of the subject invention.

With particular reference to FIGS. 1, 2, and 3, the numeral 10 designates generally drive means for the upper end of an elongate agitator or impeller shaft 12 which extends through the nozzle N in top wall 14 of an elongate vessel the contents of which are adapted to be agitated incident to rotation of shaft 12.

The drive means 10 includes a motor 18 and a gear reducer 20 each of which are secured to and carried by plate 21 of a cart or carriage 22 which is mounted for movement between fully advanced and retracted positions along a pair of substantially C-shaped tracks 24 which are in turn secured to and carried by extension 26 of a support framework 28 which is defined by a plurality of laterally spaced side members 30, the lower ends of which are integral with portions of horizontal plate or flange 32 (FIG. 1), which is in turn securely, though releasably, anchored relative to the upper surface of the nozzle flange via bolt-studs 34 which, as illustrated in FIGS. 2 and 3, project upwardly from bosses 36 which are integral with upper portion 14 of the vessel. Plate or flange 32 is secured relative to the bolt-studs 34 by nuts 37 and 38 which respectively engage the upper and lower surfaces of flange 32.

The rear half of plate 21 is provided with a pair of transversely spaced front wheels 40 and a pair of transversely spaced rear wheels 42 which are received within the upper and lower legs of the C-track members 24. In the preferred embodiment of the invention, track 24 is disposed at substantial right angles with the vertical axis of the agitator shaft and the rear wheel 42 will, when the carriage is in its fully advanced position, to the left, as in FIG. 2, be spaced about $\frac{1}{8}$" out of contact with the lower leg 25 of the track during those periods of time when the forward portion of plate 21 is secured to pedestal 54 of and at the upper end of side members 30 by bolts 52. When bolts 52 are released the weight distribution on plate 21 is such as to cause the rear end thereof to tilt downwardly about front wheels 40 until the rear wheels 42 contact lower leg 25 of the track whereby the undersurface of the forward portion of plate 21 will be disposed slightly above and out of contact with the upper surface of pedestal 54, when thus slightly tilted carriage 22 may be easily moved laterally relative to the pedestal and the upper end of the agitator shaft in the direction of headed arrow 44 of FIG. 3 to its fully retracted position with both sets of wheels 40 and 42 in engagement with the lower leg 25 of track 24.

A barrier member 46, as best illustrated in FIG. 1, is secured in spanning relationship with respect to the free, outer, right ends of tracks 24 by means of fasteners 48 which are secured to transverse member 50, the opposite ends of which are fixedly secured to tracks 24. Barrier 46 limits the travel of the carriage and determines the fully retracted position thereof as established when rear wheels 42 engage the barrier, as illustrated in FIG. 3.

When the carriage has been moved to the fully advanced or forward position of FIG. 2, the extent of its forward travel is determined by abutment of a portion of the carriage, or by an adjustable stop projecting from the carriage, against the adjacent (right) side of the pedestal 54 in which position the carriage may be securely and accurately, though releasably, maintained by means of shoulder bolts 52 which extend through openings in plate 21 and upper plate or pedestal 54 of the support framework 28.

The gear reducer is accurately located on the forward end of carriage plate 21 by means of dowel pins, not illustrated, to insure precise axial alignment of its output drive shaft 80 with the upper end of the agitator shaft when the carriage is in its fully advanced position.

Housing 56 which contains rotatable sealing means which engage the upper end-adjacent portion of the agitator shaft 12 is supported on horizontal plate 32 of the frame by means of bolts 58 which project through openings in the mounting flange 60 of the housing 56, said bolts engaging complementary tapped holes in plate 32. Straight dowel pins 57 which project from the lower surface of the mounting flange 60 of the sealing cartridge 56 are receivable within dowel-receptive holes 59 in the upper surface of plate 32 for insuring precise and accurate alignment of said housing relative to the upper end of the agitator shaft which projects upwardly through the nozzle N.

Four tapped access holes 62 are provided in the seal housing 56 (see FIG. 1) for providing access to set screws 64 by which the seal cage 68 of the seal assembly within the housing is attached to the agitator shaft 12 at the reduced diameter portion 70 thereof. Pipe plugs 66 threadably engage access holes 62 and function as closure members for said access holes.

Figure 5:
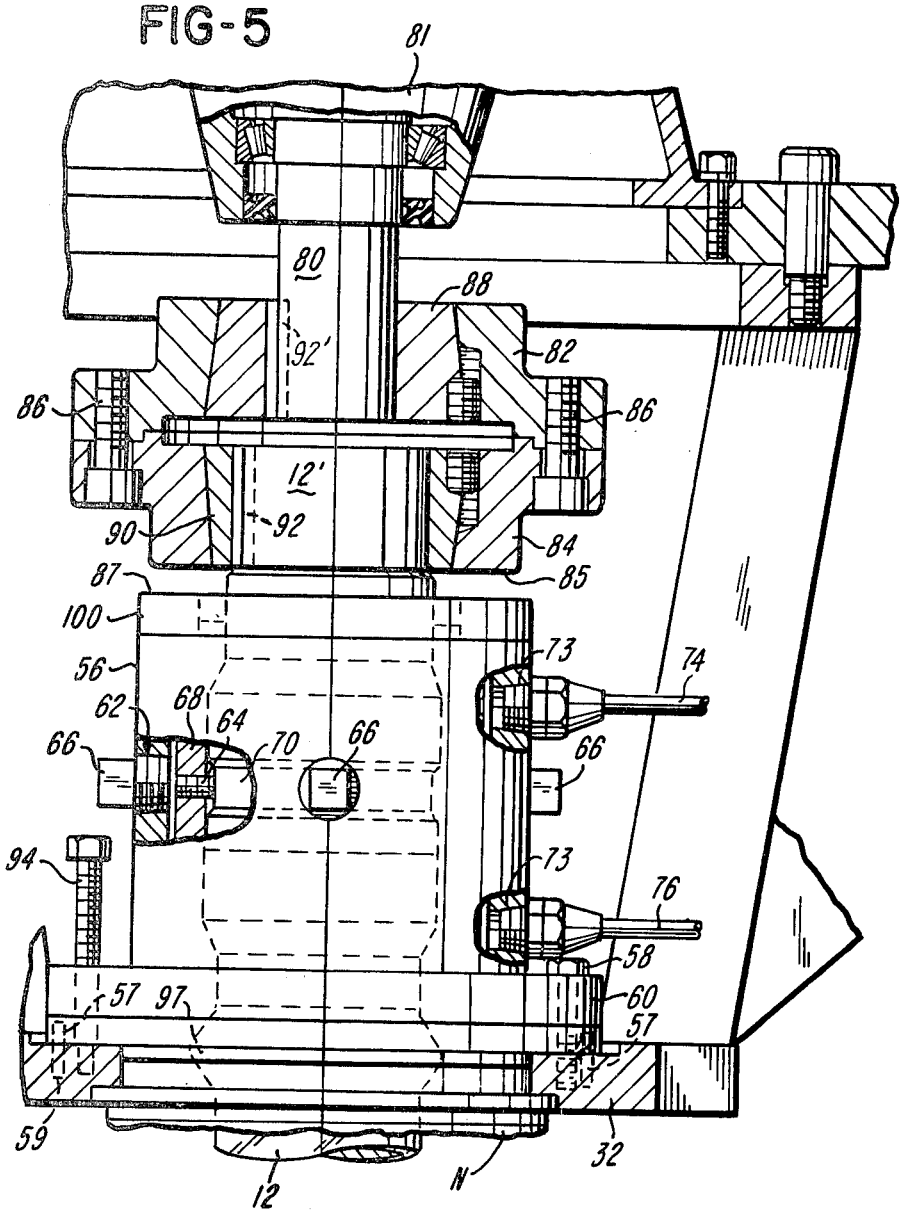
FIG. 5 is a view partly in section on a larger scale taken on line 5—5 of FIG. 2.

A pressure lubricator 72 (FIG. 1) suitably mounted relative to support framework 28, is interconnected by tubing 74 and 76 to internally threaded openings 73 in the seal housing 56, as illustrated in FIG. 5.

In FIG. 2 the drive means is illustrated in driving-supporting relationship with respect to agitator shaft 12.

The comparatively short output drive shaft 80 of the speed reducer is adapted to be secured in driving-supporting relationship with respect to the upper end of 12' of the agitator shaft such as, by means of a 2-piece Dodge Taper-Lock ® coupling member which comprises an upper portion 82 and a lower portion 84 which are interconnected by bolts 86. A tapered cone 88 of the upper coupling 82 is disposed in driven relationship with shaft 80 by means of a key 92' and a second tapered cone 90 of the lower coupling 84 is in driven relationship with the upper end 12' of the agitator shaft by means of a key 92.

Uniformly satisfactory results have been obtained in those instances in which the bearing cap 81 of the speed reducer 20 is provided with bearings B, as illustrated in FIG. 5, which engage the output drive shaft 80 adjacent the lower end of the bearing cap whereby the drive shaft projects a relatively short distance, in the neighborhood of four inches, below said bearings, such as embodied in the Cone helical/worm reducer manufactured by the Cone Drive Division of Ex-Cell-O Corporation, Traverse City, Michigan.

When the coupling members 82 and 84 are interconnected in the driving-driven relationship of FIGS. 2 and 5, the entire weight of the agitator shaft 12 is suspended from drive shaft 80 with the lower axial surface 85 of the lower coupling 84 spaced above the upper axial surface 87 of the seal housing 56 by about ¼ inch.

When it becomes necessary or desirable to remove the seal within housing 56 for inspection or replacement, the tubing 74 and 76 is disconnected from seal housing 56 after which pipe plugs 66 are removed in order that the rotary seal set screws 64 may be backed off, out of engagement with reduced portion 70 of the agitator shaft 12 thereby freeing the seal cage 68 within housing 56 from engagement with agitator shaft 12.

As bolts 86 are removed to effect separation of the upper and lower coupling members 82 and 84, the lower coupling member 84 and the agitator shaft will be simultaneously lowered a short distance until axial surfaces 85 and 87 of the coupling 84 and seal housing 56 are in contact whereby the weight of the agitator shaft is transferred from drive shaft 80 to the seal housing 56. Removal of bolts 86 effects disconnection of the driven connection between shaft 80 and 12'.

Thereafter, the shoulder bolts 52 are removed thereby freeing the forward end of plate 21 from the pedestal 54 thereby permitting the cart to tip to slightly separate the adjacent surfaces of the plate 21 and pedestal whereby the cart or carriage 22 will be free to move laterally to the right from the position of FIG. 2 to the position of FIG. 3 on rollers 40 and 42. Thus the entire drive mechanism or means 10 is disposed entirely to one side thereby affording free access, in the space theretofore occupied by the gear reducer, to the lower coupling member, the upper end of the agitator shaft, and the rotary seal member without having to resort to bodily lifting of the drive means relative to the agitator shaft, it being noted that the upper coupling member 82 remains secured to drive shaft 80.

As clearly illustrated in FIG. 1, pedestal plate 54 is provided with a key-hole-shaped opening which includes a substantially circular central portion and a narrower throat portion 0 which is in open communication to the right of the central portion for thereby providing a passageway through which drive shaft 80 and its coupling member 82 are adapted to pass incident to lateral movement of the driving mechanism from the fully advanced position of FIG. 2 to the fully retracted position of FIG. 3.

Figure 6:
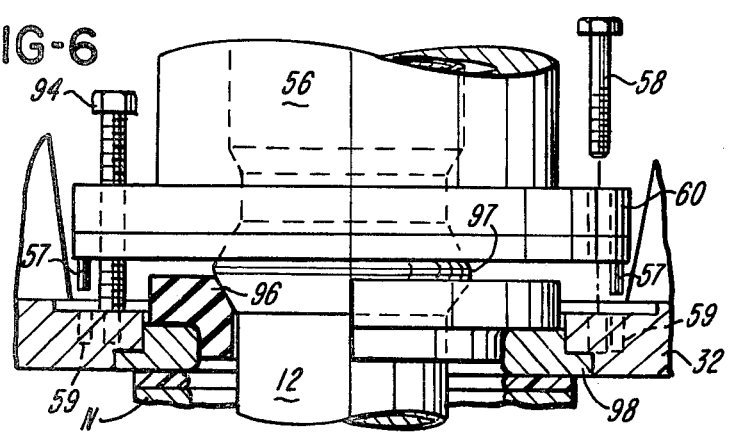
FIG. 6 is a fragmentary view of the lower portion of FIG. 5 illustrating in greater detail the relationship of the parts.
Figure 7:
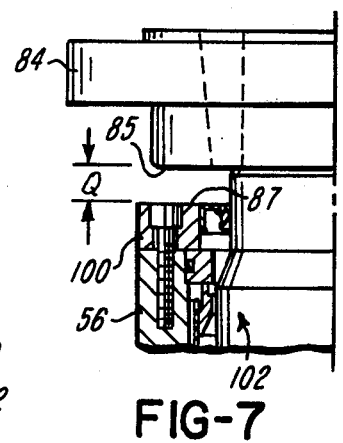
FIG. 7 is a fragmentary view partly in section showing the coupling and the agitator seal.

The seal housing 56 may be released from plate 32 incident to removal of bolts 58. Suitable means, such as by way of example, jack screws 94 may be associated with the openings in bottom flange 60 of the seal housing whereby to exert a lifting action sufficient to elevate the entire housing and the agitator shaft 12 suspended therefrom by an amount sufficient to permit the insertion of a pair of resilient retainer halves 96 between the agitator shaft 12 and the glassed insert 98, and as the jack screws are backed upwardly the seal housing and agitator shaft will be lowered whereby the entire weight of the agitator shaft will be transferred to the resilient members 96 at enlarged portion 97 of the shaft, as illustrated in FIG. 6, further lowering of the jack screws will result in the agitator shaft being moved upwardly within and relative to the seal housing 56 whereby axial surface 85 of the lower coupling member 84 will be spaced above axial surface 87 of the seal housing 56 by approximately ¼ of an inch as indicated by the dimension Q of FIG. 7. Tapered coupling 84 is then removed from upper end 12' of the agitator shaft after which the top plate 100 of the seal assembly is backed off approximately ⅜ of an inch to effectively unload spring-loaded wedges and rings indicated generally at 102 of FIG. 7. Thus the seal assembly 56 can be readily removed from the agitator shaft 12 in order that it may be inspected, repaired, or replaced by another seal assembly.

From the foregoing it will be noted that the weight and support of the agitator shaft is thus transferred from the drive shaft to the seal housing thence to retainer halves 96 without need to enter the vessel whereby the seal assembly can be removed from the agitator shaft.

In FIG. 8 a modification of the drive mechanism is disclosed wherein motor M is secured in driven relationship with input shaft 118 of gear reducer G by means of coupling elements 120 and 122 mounted respectively on shaft 118 of the gear reducer and shaft 124 of the motor.

Motor M is securely though releasably anchored to the upper surface of support bracket 126 which projects from side members 30 of the support framework 28. The base plate 130 of the gear reducer G is securely though releasably anchored by means of bolts 132 to the upper mounting flange 54 of the support framework 28 which is provided with an opening such as 0 in plate 54 of FIG. 1, but wherein said opening is disposed in an opposite direction—that is, in the left side of mounting plate 54 of FIG. 1 whereby the gear reducer G may be slid in a lateral direction to the left in FIG. 8 after bolts 132 have been removed and after lower coupling member 84 has been released from upper coupling member 82 in a manner heretofore described with reference to the descriptions of FIGS. 2, 3, and 5. By thus laterally moving the gear reducer relative to motor M, access will be provided to coupling member 84 of the upper end 12' of the agitator shaft 12 without the necessity of headroom above the gear reducer in order to effect the coupling or uncoupling of coupling members 82 and 84.

It should be understood that the present invention is neither directed to nor concerned with the specific structural details of seal housing 56 and/or the seal mechanism contained therein other than the fact that said housing is normally supported on horizontal plate 32 of the support framework 28, and wherein the upper axial surface 87 thereof is so constructed and arranged as to provide full and adequate support for lower coupling member 84 and the weight of agitator shaft 12 during those periods of time when the coupling members are in the process of being disengaged incident to the removal of bolts 86.

From the foregoing it will be noted that we have thus provided a low profile drive for the upper adjacent end of a vertically disposed, rotatably mounted, agitator shaft which, when operative, is suspended from the drive shaft of the driving mechanism which is secured above and in spaced relationship with respect to the upper end of the agitator shaft, and wherein said drive mechanism is adapted to be laterally shifted relative to the upper end of the agitator shaft for providing free access thereto.

What is claimed is:

1. In combination with a chemical reaction vessel having a housing and a drive nozzle, a low profile drive assembly; comprising:
    (a) an elongated agitator shaft with an upper end extending through the drive nozzle of the reaction vessel;
    (b) removable cartridge seal means associated with the agitator shaft;
    (c) low profile drive means with output shaft means for releasably connecting with the upper end of the elongated shaft;
    (d) carriage support means connected to the housing of the reaction vessel within the overall height dimension of the drive means, said carriage support means including track means for guiding movement of a carriage;
    (e) carriage means movably mounted upon the carriage support means, said low profile drive means being supportively carried by the carriage support means for movement along a path defined by said track means to move the drive means and output shaft thereof sidewise laterally from a closely spaced, vertical alignment with the upper end of the agitator shaft to a position which provides access to the upper end of the agitator shaft and the cartridge seal means removably associated therewith within the overall height dimension of the drive means in the area occupied by the drive when in axial alignment with the agitator shaft.

2. A drive as recited for in claim 1, wherein the elevation of the output shaft relative to the vessel adjacent the drive nozzle is substantially constant when said shaft is in and out of axial alignment with the upper end of the agitator shaft.

3. A drive as recited for in claim 1, wherein the upper end of the agitator shaft is fully suspended from the output shaft when the agitator shaft is connected in axial alignment with the drive shaft.

4. A drive assembly as recited in claim 3, wherein the adjacent ends of the output and agitator shafts terminate in connectable coupling means, and further including means for elevating the agitator shaft from a position in which the agitator shaft is supported by the seal means to an elevated position in which the agitator shaft is suspended from the drive output means.

5. A drive assembly as recited in claim 4, wherein disconnection of the coupling means lowers the agitator shaft and its coupling by an amount to permit free, sidewise, lateral movement of the coupling incident to movement of the carriage means from its first to second position.

6. A drive assembly as recited in claim 5, wherein means are provided for supporting the weight of the agitator shaft when lowered incident to disconnection of said coupling means.

7. A drive assembly as recited in claim 1 wherein the carriage support means includes an upstanding framework having a lower end which is anchored relative to the drive nozzle of the vessel and an upper end which terminates in a pedestal above the upper end of the agitator shaft, and wherein said track means includes a surface carried by and projecting from said framework upon which the carriage means is movable between a first and a second position.

8. A drive assembly as recited in claim 7, wherein the carriage means includes a rigid member having a forward portion which projects in cantilever fashion from the rear portion thereof, and wherein the said rear portion includes means mounting the carriage means for movement on the surface of the carriage support means.

9. A drive assembly as recited in claim 8, wherein gear reducer means are secured to and carried by the forward portion of said rigid member with the output shaft thereof projecting downwardly through an opening in said rigid member, and a motor for driving the gear reducer is secured to and carried by the rear portion of the rigid member.

10. A drive assembly as recited in claim 9, wherein the relationship between the output and agitator shafts is characterized by the complete absence of bearings on the output shaft below the gear reducer and the absence of bearings on the agitator shaft.

11. A drive assembly as recited in claim 9, wherein the surface upon which the carriage means is movable includes a pair of laterally spaced, substantially horizontal tracks which project from the framework at a location below the pedestal whereby the undersurface of the forward portion of the rigid member of the carriage is disposed over the upper surface of the pedestal when the carriage means is in its first position.

12. A drive assembly as recited in claim 11, wherein said tracks are defined by outturned C-shaped channels having vertically spaced upper and lower track-defining legs.

13. A drive assembly as recited in claim 12, wherein the rear portion of the rigid member of the carriage includes two pair of laterally spaced wheels, one pair of which is located adjacent the rearmost end of said rigid member and the other pair of which are located adjacent the foremost end of said rigid rear portion, said wheels being received between the upper and lower legs of said C-shaped track defining channels.

14. A drive assembly as recited in claim 11, which includes means for releasably anchoring the carriage means in said first position against accidental or unintentional movement therefrom with the adjacent surfaces of the pedestal and forward portions of the rigid member of the carriage in contacting relationship.

15. A drive assembly as recited in claim 14, wherein abutment means are provided for determining the extent of travel of the carriage means when in said first and second positions relative to the upper end of the agitator shaft.

16. A drive assembly as recited in claim 14, wherein the relationship between the diameter of the wheels of the carriage and the spacing between the upper and lower legs of the C-shaped track defining channels are such that the carriage is tiltable about the wheels which are adjacent the foremost end of the rear portion of the rigid member, and whereby the rearmost wheels are spaced above and out of contact with the lower legs of said tracks during those periods of time when the carriage is anchored in its first position.

17. A drive assembly as recited in claim 16, wherein the weight distribution of the gear reducer and motor on the carriage is such that the rear portion thereof will tilt downwardly about the wheels which are adjacent the foremost end of the rear portion of the rigid member until the rearmost wheels engage the lower legs of the tracks incident to release of the means by which the carriage is anchored in its first position, whereby the adjacent surfaces of the pedestal and the forward portion of said rigid member of the carriage means are separated to facilitate movement of the carriage means to the said second position.

* * * * *